United States Patent [19]
Ussery

[11] 3,834,365
[45] Sept. 10, 1974

[54] CRANKCASE SCAVENGER AND SMOG REDUCER

[76] Inventor: Isaac S. Ussery, 10121 Denny St., Oakland, Calif. 94603

[22] Filed: Mar. 30, 1973

[21] Appl. No.: 346,304

[52] U.S. Cl............ 123/119 B, 123/41.86, 137/426
[51] Int. Cl........................................ F02m 25/06
[58] Field of Search......... 123/119 B, 198 A, 41.86; 137/426

[56] References Cited
UNITED STATES PATENTS

| | | | |
|---|---|---|---|
| 1,339,465 | 5/1920 | Luke | 123/119 B |
| 1,936,111 | 11/1933 | Hauke | 123/119 B |
| 1,960,982 | 5/1934 | Stover | 123/119 B X |
| 2,646,784 | 7/1953 | McKeever | 123/119 B X |
| 3,236,216 | 2/1966 | Van Dolah | 123/119 B |
| 3,257,995 | 6/1966 | Schnabel | 123/41.86 |
| 3,338,223 | 8/1967 | Williams | 123/134 |

Primary Examiner—Charles J. Myhre
Assistant Examiner—Tony Argenbright
Attorney, Agent, or Firm—William R. Piper

[57] ABSTRACT

A crankcase scavenger and smog reducer which receives gaseous fumes through a conduit that leads from the crankcase of an internal combustion engine and draws these fumes through a body of the fuel used to operate the engine, this body of fuel being contained in a separate tank and diluting any hydrocarbons in the fumes and permitting the heavier particles to drop to the bottom of the body of fuel. A cone-shaped diffusion member is mounted on the outlet end of the conduit and is submerged in the fuel body. The fumes will be drawn through the body of fuel and out through the top of the tank by means of a conduit that leads to the intake manifold. The vacuum created in the intake manifold is sufficient to draw the washed fumes from the top of the tank.

2 Claims, 3 Drawing Figures

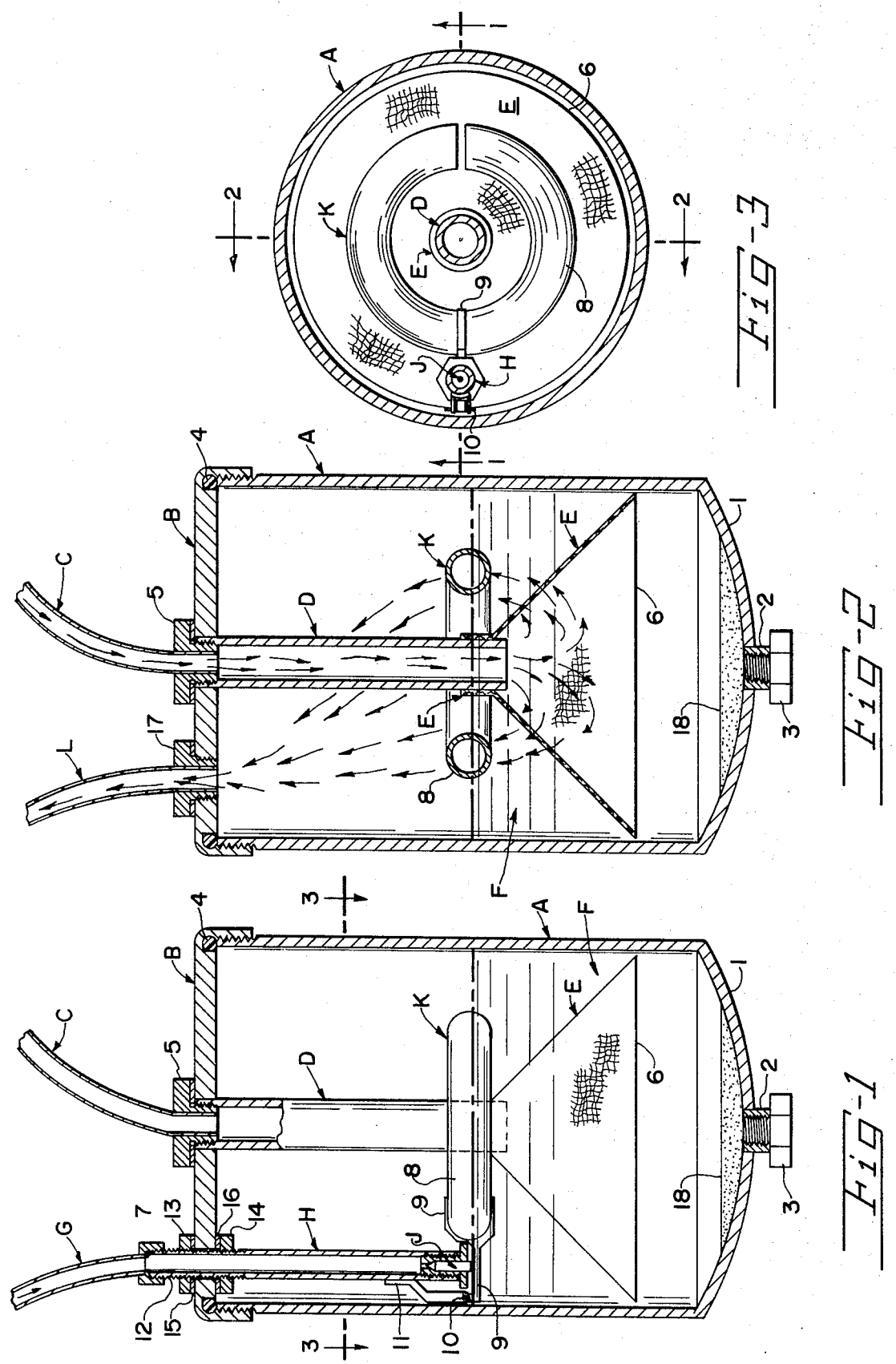

CRANKCASE SCAVENGER AND SMOG REDUCER

BACKGROUND OF THE INVENTION

1. Field of the Invention

The fumes in the crankcase of an internal combustion engine escape through the breather pipe that communicates with the interior of the crankcase and with the atmosphere. The fumes that do escape add to the smog conditions in the atmosphere. It is the purpose of the present invention to prevent these fumes from escaping into the atmosphere and instead to pass them through a body of a portion of the same fuel that is used to operate the engine. The body of fuel acts as a dilutant for the fumes and the heavy hydrocarbons and other foreign matter contained in the fumes will be precipitated out from the fumes and will drop to the bottom of a separate tank that carries the body of fuel. The fumes then are passed through a conical diffusion element that will trap any foreign matter and only permit a burnable material to pass through the element. This burnable material is then conveyed back to the intake manifold or to the carburetor where it is mixed with air in the usual manner to form a combustible mixture. I make use of the vacuum created in the intake manifold of the engine to draw the scrubbed or washed fumes from the top of the tank after they have passed through the body of fuel and through the conical diffusion element.

2. Description of the Prior Art

The patent to Clarence R. Callaway et al., No. 2,450,864, issued Oct. 5, 1948 for a crankcase ventilating apparatus, discloses a housing mounted above a collecting bowl and carrying a filter that separates the interior of the collecting bowl from the upper interior portion of the housing. A pipe leads from the engine crankcase to the upper portion of the housing so that fumes from the crankcase will enter the housing and then pass through the filter before passing through a central pipe in the collecting bowl that conveys the fumes through a control valve and then a pipe that carries them to the intake manifold of the engine. The patentees state that the fumes will be sufficiently cooled by the time they pass through the filter that the heavier hydrocarbons will condense, forming a pool of liquid in the bottom of the bowl while the remaining fumes will enter the central pipe and be conveyed past the control valve and will enter the intake manifold.

The patentees had no thought of conveying the crankcase fumes through a body of the same fuel that is used for operating the engine, this body of fuel washing out from the fumes any heavy particles which will precipitate to the bottom of the body and then causing the washing vapor fumes to pass through a diffusion element before they are conveyed to the carburetor or intake manifold.

SUMMARY OF THE INVENTION

An object of my invention is to provide a crankcase scavenger and smog reducer that will receive all of the fumes from the breather pipe that communicates with the crankcase. Novel means is provided for maintaining an auxiliary body of fuel in a separate tank and for automatically feeding additional fuel from the engine fuel tank to the separate tank as required. The fumes from the crankcase are passed through a portion of the auxiliary fuel body for washing or scrubbing out any foreign particles. Such washed out particles will gravitate to the bottom of the auxiliary fuel body where they may be removed from time to time.

A further object of my invention is to provide a conical diffusion element made from a fine mesh screen. The diffusion element is submerged in the auxiliary fuel body and the washed vapor fumes are forced through this element so that any other foreign particles remaining in the vapor will be trapped in the element. The fumes when passing through the diffusion element are cleansed to a point where they can be conveyed to the engine carburetor for mixing with air to form a combustible mixture that is delivered to the engine intake manifold. The washed fumes could be delivered directly to the intake manifold.

BRIEF DESCRIPTION OF THE DRAWING

FIG. 1 is a vertical section through a tank that contains the auxiliary body of fuel and is taken along the line 1—1 of FIG. 3.

FIG. 2 is another vertical section through the tank and is taken along the line 2—2 of FIG. 3, and is at right angles to the section in FIG. 1.

FIG. 3 is a horizontal section through the tank and is taken along the line 3—3 of FIG. 1.

DESCRIPTION OF THE PREFERRED EMBODIMENT

In carrying out my invention, I provide a tank indicated generally at A. This tank has a dish shaped bottom 1 with a centrally disposed outlet 2 that is internally threaded to receive a drain plug 3. The open cylindrical top of the tank A is externally threaded for receiving a cover B. An O ring 4 is placed between the cover and the rim of the tank and acts as a sealing ring between the two.

A vacuum line C communicates with the crankcase, not shown, of an internal combustion engine, not shown, and its other end extends to the top of the tank A and is connected by a nipple 5 to a central pipe D that extends through a center opening in the cover B. Both FIGS. 1 and 2 illustrate the central pipe D communicating with the vacuum line C and extending downwardly from the cover B and into the tank A. A conical diffusion element E is attached to the lower end of the central pipe D and the diameter of the lower larger end 6 of the element is slightly less than the inner diameter of the tank A. The lower circular edge 6 of the diffusion element E is disposed a slight distance above the dish-shaped bottom 1 of the tank A.

I provide novel means for maintaining a body of fuel F in the tank A and keeping the surface of the fuel at a constant level. A fuel line G, see FIGS. 1 and 3, leads from the vehicle fuel line, not shown, and has its other end connected to a fuel delivery pipe H by a nipple 7. The fuel delivery pipe H extends through the cover B and the pipe H is disposed near the inner surface of the cylindrical casing of the tank A. A needle valve J is mounted at the lower outlet end of the fuel delivery pipe H and it controls the flow of fuel from the fuel supply line, not shown, to the tank A.

A float indicated generally at K, for controlling the opening and closing of the needle valve J comprises a split ring-shaped floatable member 8 whose midpoint is connected to an arm 9 that is pivoted at 10 to a bracket 11, the latter being connected to the fuel delivery pipe H, see FIG. 1. The needle for the needle valve J is supported by the arm 9 and is raised into closed position by the float K when the level of the fuel F in the tank A reaches a predetermined point. The lower end of the central pipe extends a short distance below the fuel level. As soon as the level of the liquid in the tank A drops below the predetermined point, the float K will swing downwardly and open the needle valve J to permit more fuel from the fuel supply line, not shown, to flow into the tank A until the proper level in the tank is reached whereupon the valve will again close.

It is possible to change the normal level of the liquid in the tank A by raising or lowering the position of the fuel delivery pipe H because this in turn will raise or lower the float K in the tank. In FIG. 1, I show the upper portion of the pipe H threaded at 12. A pair of nuts 13 and 14 are mounted on the threaded portion 12. The nut 13 presses a gasket 15 down upon the outer surface of the cover B and the nut 14 presses a gasket 16 up against the under surface of the cover in order to make a liquid tight seal with the cover. The nuts 13 and 14 can be adjusted on the pipe H for raising or lowering the pipe with respect to the tank and this will raise or lower the float K in the tank. The position of the float in the tank determines the normal level of the liquid in the tank A.

A vacuum line L extends from the cover B to the intake manifold, not shown, of the internal combustion engine, now shown, see FIG. 2. A nipple 17 connects the vacuum line L to the cover B and the vacuum line communicates with the upper portion of the tank A and will draw the washed and filtered fumes from the tank and convey them to the intake manifold of the engine where they will be used to power the engine.

Both FIGS. 1 and 2 illustrate how the foreign particles that are screened from the washed and filtered crankcase fumes will gravitate to the bottom of the tank A where they will collect as sludge, indicated generally at 18 in the dish-shaped bottom 1 of the tank. The drain plug 3 may be removed from the tank bottom 1 from time to time to wash out the sludge after which the plug can be reinserted into the outlet 2 at the bottom of the tank.

The removal of sludge from the crankcase, not shown, will significantly increase the life of the engine due to the fact that the metal particles, carbon and other abrasive material are not allowed to re-enter the engine through the intake manifold.

OPERATION

From the foregoing description of the various parts of the device, the operation thereof may be readily understood. FIG. 2 illustrates by arrows how the fumes from the engine crankcase, not shown, will flow through the pipe C, and pass into the central pipe D in the tank A. Then the fumes will flow out through the lower end of the pipe D and will be forced through the auxiliary body of fuel F before they will pass through the conical element E. The fuel body F will wash out foreign matter in the fumes and any heavy particles will settle at the bottom of the tank A. The vibration of the vehicle, now shown, in which the tank is mounted, will aid in shaking loose the foreign particles from the fumes and from the diffusion element E. The diffusion element E is completely immersed in the body of liquid fuel F.

The washed fumes in passing through the conical diffusion element E, see FIG. 2, will have other foreign particles removed and the washed and filtered fumes will be drawn up into the conduit L and be conveyed to the engine carburetor by the vacuum created in the engine intake manifold. The fumes from the crankcase instead of passing through the breather pipe and entering the atmosphere to increase the smog condition, will be conveyed to the tank A where they will be washed and filtered and then enter the carburetor to be used as a combustible mixture in the engine. The level of the auxiliary body of fuel F will be maintained automatically by the float-controlled meedle valve J.

To summarize: the object of my invention is to remove smog and sludge-laden fumes from the crankcase of an internal combustion engine by the use of the vacuum in the intake manifold. These fumes are drawn through the conduit C from the crankcase and are delivered to the tank A where they are forced through the auxiliary body of fuel F and then through the diffusion element E. From here the washed fumes are drawn through the conduit L past a control valve, not shown, and delivered to the intake manifold where they will mix with the other explosive mixture. It will be seen that the submergence of the fumes in the fuel wash F, the passing of the fumes through the conical diffusion element E, the shaking of the element caused by the operation of the engine, not shown, all tend to remove and separate heavy foreign particles from the fumes and cause these particles to settle to the bottom of the tank A. The partially burned hydrocarbons in the fumes from the crankcase are remixed with the fuel F in the tank A and are freed from carbon and foreign particles and thus become burnable gas and can be delivered to the intake manifold and to the internal combustion engine as fuel and will not load the engine parts with sludge.

I claim:

1. In combination:
   a. a tank for containing a combustible liquid fuel;
   b. a fuel inlet first conduit extending downwardly from the top of said tank, a float controlled valve normally closing the lower fuel outlet end of said conduit, and a float resting on the surface of the combustible liquid fuel and being operatively connected to said valve for opening the valve when the surface of the liquid drops below a predetermined point for admitting more liquid to said tank;
   c. a second conduit for conveying fumes from a crankcase to said tank, said second conduit having its outlet end disposed a slight distance below the fuel level;
   d. a conical-shaped diffusion element connected to the outlet end of said second conduit and being submerged in the fuel, the lower edge of the diffusion element lying adjacent to the inner surface of the tank side wall so that all of the fumes issuing from said second conduit must pass through a portion of the body of fuel in the tank and also must pass through said diffusion element for removing carbon and foreign particles from the fumes;
   e. a third conduit leading from the top of said tank and communicating with the engine intake manifold so that the vacuum created in the intake manifold will be sufficient to draw the washed fumes from said tank and through said third conduit and into the intake manifold; and
   f. means for vertically adjusting the position of said first conduit for raising or lowering the valve and float for altering the depth of the liquid in said tank for causing the fumes to travel through the desired volume of liquid for thoroughly washing the fumes.

2. The combination as set forth in claim 1: and in which
a. the bottom of said tank is adapted to hold any sludge that is removed from the fumes as they pass through a portion of the body of fuel and as they pass through the diffusion element, and
b. a drain plug normally closing a drain opening in said tank, said plug being removable for removing the sludge from the tank.

* * * * *